INVENTORS:
WILLEM P. HENDAL
PIETER VISSER
BY: *John H. Colvin*
THEIR ATTORNEY

United States Patent Office 3,081,256
Patented Mar. 12, 1963

3,081,256
PROCESS AND APPARATUS FOR CARRYING OUT CHEMICAL REACTIONS
Willem P. Hendal and Pieter Visser, Amsterdam, Netherlands, assignors to Shell Oil Company, New York, N.Y., a corporation of Delaware
Filed May 9, 1960, Ser. No. 27,634
Claims priority, application France May 14, 1959
18 Claims. (Cl. 208—125)

This invention relates to a process for carrying out chemical reactions, in particular the cracking of hydrocarbons at high temperature by means of a molten salt as the heat transfer medium and also to an apparatus for carrying out this process.

The performance of chemical reactions by means of a molten salt is well-known. Processes of this kind consist in passing the base material to be treated in a finely divided state through a bath of salt from the surface of which the reaction products escape and are then subjected, if necessary, to further treatment in another zone. The required degree of purity of the salt of the bath is obtained by regeneration, e.g. by filtration or by treating it with an oxidizing gas. These procedures may be applied either intermittently or by keeping the molten salt in a circulation system containing a separate regeneration zone, in which case the operation can be carried out continuously.

The molten salt is kept at the appropriate temperature by a source of heat which may be a separate unit or constitute part of the regeneration process in which the heat, generated during the oxidation of the impurities taken up in the salt, is transferred to the salt. These two procedures may also be combined.

Another known process consists in passing the base material together with the molten salt through a reaction zone, the mixture of salt and reaction products leaving the reaction zone then being separated and the salt being returned through a separate re-heating zone so as to recirculate it to the reaction zone.

Such processes have, however, been found to lead to serious difficulties, owing to the fact, for example, that the molten salt is greatly contaminated. This is particularly the case with reactions of hydrocarbons. In fact, if the reactions of the carbonaceous constituents contained in the salt last too long, so that consequently free carbon is formed owing to the continued elimination of hydrogen from the carbonaceous materials, it is very difficult, if not impossible, to remove the carbon from the salt by oxidation. The free carbon runs the risk of being taken up in the salt in such a manner as to be entirely, or at least partially, enclosed by the salt, thus becoming inaccessible to the oxygen and its oxidizing effect; it is then generally no longer possible to regenerate the salt, which can then no longer be used as a heat transfer medium. This may lead to clogging of the lines of the equipment and other objectionable disturbances which prevent proper functioning.

These disturbances may also affect the end products. The fact that the reaction products are generally far from stable at the prevailing temperatures considerably contributes to this. In the known processes this may lead to the formation of various undesirable secondary products and of an excessive quantity of by-products, owing to the fact that reaction conditions, such as the temperature range, the contact time, etc., are apparently restricted to narrower limits than can be permitted with the known salt baths. The expression "by-products" means the reaction products that are inevitably formed in addition to the main product which it is desired to prepare, but which, however, are still economically useful; the secondary products are those that have no economic value and may even have an adverse effect upon the reaction. It is clear, therefore, that special measures should be taken to enable the reactions concerned to be carried out with satisfactory results.

It is for these reasons that, as far as is known, the above-mentioned processes have not been applied on an industrial scale.

It is therefore an object of the invention to provide an improved process for carrying out high temperature reactions in the presence of molten salt heat media. It is also an object of the invention to provide a continuous process for carrying out such reactions. It is a further object of the invention to provide an improved process for carrying out high temperature reactions in the presence of molten salts whereby short reaction times and rapid separation of products from the salt are greatly facilitated. A still further object of the invention is to provide such a process wherein secondary reactions are substantially reduced. Yet another object of the invention is to provide an improved apparatus for carrying out high temperature reactions in the presence of molten salts and for regeneration of the salts. Other objects will be apparent for the description of the invention and the drawing, consisting of two figures, which illustrates by means of diagrammatical cross-sections two preferred embodiments of the apparatus of the invention.

The applicants have now found what measures have to be taken to enable the above-mentioned process to give satisfactory results. According to the invention these measures consist in passing the base material in admixture with the molten salt at high speed through a tubular reaction chamber, then separating the gaseous reaction products and the salt with the carbonaceous or other oxidizable reaction components which it has absorbed in a separation zone; then discharging the reaction products from the separation zone and passing the salt leaving this zone via a liquid seal into a regeneration zone surrounding the reaction zone, in which regeneration zone the salt is regenerated by the action of an oxidizing gas and also heated to the required high temperature, and finally returning the salt with base material into the reaction chamber.

By passing the base material together with the salt through the reaction chamber at high velocity and by separating the salt from it immediately afterwards it is possible to control the contact time of the base material and reaction products with the salt completely and thus to regulate it in such a manner as to obtain the optimum result for a given reaction, as the dimensions of the reaction chamber are of course known.

According to the invention the amount and velocity of the base material to be passed through the reaction chamber are so selected as to insure that the average time of residence in the reaction chamber of the media taking part in the reaction is not more than 0.02, and preferably not more than 0.01 second. The slip occurring between the reaction media and the salt in passing through the reaction chamber is slight, and not more than the same order of magnitude as the above-mentioned residence times.

Because of the short reaction time, it is necessary that the salt and feed be mixed very rapidly. Accordingly, a preferred method of admixing is to entrain the molten salt into a high velocity stream of feed by such means as an ejector in which the feed, which may be either liquid or vapor, is the motive fluid and the molten salt is the entrained fluid.

By choosing the temperature which best suits the desired reaction, secondary reactions can be substantially avoided, or at least minimized, since the best conditions for these secondary reactions correspond to another temperature. It is thus possible, for instance when the cracking of hydrocarbons is involved, to suppress polymerization entirely, owing to the short average residence time.

As the separation zone is adjacent to the regeneration zone, which completely surrounds the reaction chamber, a liquid seal is disposed between the two zones, which prevents on the one hand gaseous reaction products from penetrating into the regeneration zone, and on the other the regeneration medium or combustion products from mixing with the gaseous reaction products.

It has been found that by regenerating the salt immediately after the reaction a favorable effect is exerted on its state and that regeneration is then as complete as possible, as in this way the formation of free carbon, which is very difficult to eliminate, is prevented.

For this reason the zones follow each other immediately, the one leading directly into the other. In order to insure very rapid regeneration after the reaction, according to the invention, the return velocity of the separated salt from the separation zone to the regeneration zone is preferably regulated so as to give the salt a residence time of at most 0.5 second in the separation zone. This result is easy to obtain by giving appropriate dimensions to the space forming the separation zone and to its discharge openings. The lower the reaction temperature the longer should be the residence time of the salt in the separation zone, as this allows the greatest possible amount of gaseous reaction products to separate from the salt. In practice, when the cracking of heavy hydrocarbons is involved (in which case the required reaction temperature is lower than that required for the cracking of light hydrocarbons), the above-mentioned maximum value is therefore adopted. The residence time in the separation zone may be much shorter in the case of reactions with lighter hydrocarbons, for instance natural gas, and may, for example, be 0.1 second or even less, down to 0.05 second.

The oxidizing gas may be air or air enriched with oxygen, which oxidizes the carbonaceous constituents absorbed by the salt; the heat thus liberated serves to reheat the salt.

It is, of course, possible that the quantity of heat thus transmitted to the salt is not sufficient for it to reach the temperature needed for the reaction. According to the invention, this difficulty may be overcome by introducing simultaneously into the regeneration zone, in addition to the oxidizing gas, a combustible gas, of which the amount is so regulated as to transmit a quantity of heat sufficient to raise the temperature of the salt to the value required for the reaction. It is, however, also possible to achieve this result by passing into the regeneration zone, in addition to the oxidizing gas, the hot combustion gases supplied from a combustion unit outside the plant, regulating the amount of these gases so as to produce a sufficient quantity of supplementary heat to heat the salt to the temperature required for the reaction. By controlling the above-mentioned amounts maximum efficiency can be attained, while none of the heat transmitted to the salt is lost by radiation, etc., as it passes from the regeneration zone into the reaction chamber, since these zones are in direct communication with each other.

As regards the salts to be used in this process, it should be noted that they should have both a satisfactory thermal conductivity and a low vapor pressure at the prevailing operating temperature, in order to prevent as far as possible entrainment of the salt by the gaseous reaction products. Moreover, the salts should be such as not to attack the construction materials of the apparatus. In most of these reactions the salt serves solely as a heat transfer medium and consequently should not react either with the base material or with the reaction products. Mixtures of salts may in many cases be usefully employed. In the case of binary or multiple mixtures the proportions of the components should be preferably so chosen as to make them correspond to a eutectic point.

Some of the salts suited to this purpose are of the kind often designated as hardening salts in the metallurgical industry. Other salts which give satisfactory results are, for instance, alkali sulfates or chlorides or their double salts. A potassium salt or a mixture containing a potassium salt may be advantageous when free carbon is likely to form in the course of the reaction, since carbon is less difficult to remove from potassium salts than from other salts. Metal chlorides, sulfides and cyanides may also be used in principle as heat transfer media in the process.

The invention also relates to an apparatus suitable for carrying out the process referred to above. This apparatus consists of a tubular reaction chamber provided with an inlet for the base material and an inlet for the molten salt, and an outlet for reaction products communicating with a separation chamber in which they are separated, fitted with an outlet for the gaseous reaction products and an outlet for molten salt with the carbonaceous constituents absorbed thereby, this outlet communicating with a salt-regeneration chamber provided with an outlet opening into the reaction chamber.

According to the invention, the apparatus consists of at least one tubular reaction chamber inside a regeneration chamber which entirely surrounds it, and on the intake side the reaction chamber(s) communicates (communicate) with the regeneration chamber by one or more openings, the separation chamber communicating directly with the reaction chamber(s) on the outlet side, and this separation chamber communicating with the regeneration chamber via a liquid seal, the relative positions of the reaction chamber or chambers, separation chamber and regeneration chamber being so selected that at least the greater part of the reaction chamber or reaction chambers is surrounded by molten salt while the apparatus is working.

The base material or feed inlet of each reaction chamber, for instance in the form of an ejector, is situated in the immediate vicinity of the inlet opening or openings for salt in the reaction chamber or chambers, so that while the apparatus is working, the salt passes with the feed into the reaction chamber or chambers by the effect of the ejector.

By this means, if the base material inlet is of a suitable size, the amount of salt entrained may be varied within wide limits. By selecting the proper intake velocity for the base material and hence for the molten salt one can control the average residence time of the reactants and the salt in the reaction chamber, since this chamber can be given the appropriate dimensions. The possibilities of control can be increased still more by making adjustable, according to the invention, the cross-section of the salt inlet openings in the reaction chamber or chambers.

The residence time of the salt in the separation chamber may be kept at the desired value by providing the liquid seal in the separation chamber with one or more discharge openings of adjustable cross-section leading into the regeneration chamber.

The regeneration chamber should preferably be provided with at least one intake line for the oxidizing gas, issuing into the molten salt at a position located between the salt outlet issuing from the reaction chamber, and the salt outlet of the separation chamber, and with an outlet for combustion gas above the salt. This prevents unregenerated salt from entering the reaction chamber.

The regeneration chamber is preferably provided with an additional source of heat to insure that during the operation of the apparatus the salt is again heated to the required temperature. The source of heat may consist of an immersion heater element introduced into the salt bath operating either by means of a hot combustion gas or a gaseous fuel.

The separation chamber is also preferably provided with a means for quenching the final product which is generally still not stable at the prevailing temperature.

The quenching means should preferably be arranged as close as possible to and directly behind the point where the salt and the gaseous reaction products are actually separated, so that the reaction products have already been quenched when they pass through the part of the separation chamber of which the walls are not wetted by the salt. This prevents solid matter, e.g. carbon, from being deposited on the part of the wall in question, which might lead to operational hold-ups. The quenching medium may be, for example, water or steam.

If the capacity of the installation has to be larger, it may consist, according to the invention, of a number of tubular reaction chambers, disposed, for example, on the circumference of a circle, surrounded by a common regeneration chamber and communicating with a common separation chamber having a central system for returning the salt to the regeneration chamber.

The invention will now be described in detail with reference to the attached drawing consisting of two figures which represent, in a diagrammatical cross-section, examples of two apparatuses according to the invention and in which.

Figure 1:
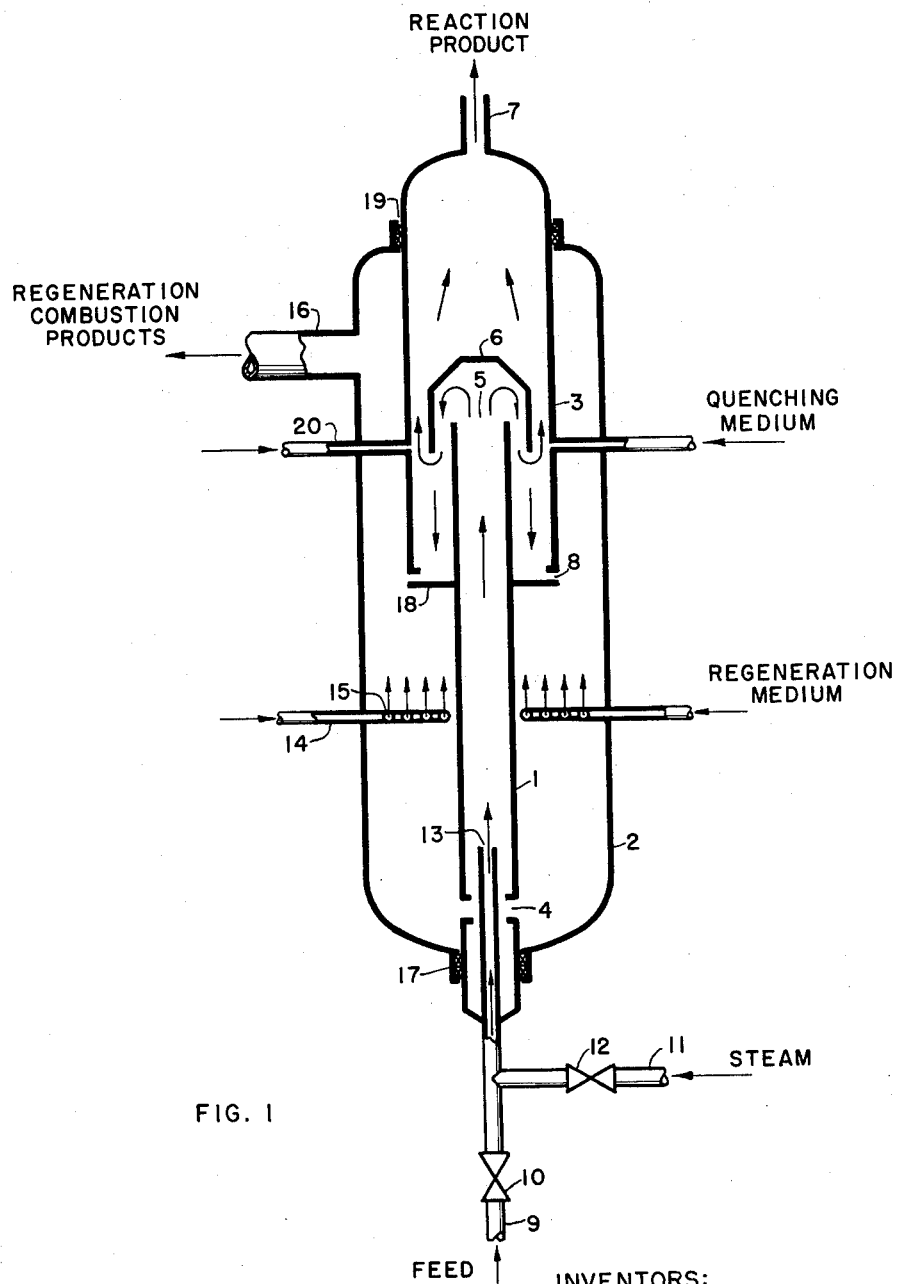
FIG. 1 shows an apparatus comprising one reaction chamber only.

Referring to FIGURE 1, a vertical tubular reaction zone 1 is disposed almost entirely within a cylindrical regeneration zone 2. A separation zone 3 is disposed at the end of reaction chamber 1 and partly surrounds it. Reaction zone or chamber 1 has inlet openings 4 for molten salt, which communicate directly with the regeneration chamber 2. On the discharge side the reaction chamber communicates directly with the separation chamber 3 through an opening 5. The separation zone contains an inverted basin 6 which prevents the gaseous reaction products from entraining the molten salt via a discharge 7. The separation chamber 3 is also provided with a discharge opening 8 for molten salt opening into the regeneration chamber 2. A feed line 9 for the base material communicates via a valve 10 with a nozzle 13 axially situated in the reaction chamber 1 in the immediate vicinity of the openings 4. If necessary, steam may be applied to the base material via a line 11, fitted with a valve 12, to promote atomization by the nozzle 13. Moreover, steam may promote the reaction. A supply line 14 for regeneration medium communicates with a number of annular lines 15 arranged in the regeneration chamber, and which are provided with a number of openings. The lines 15 are arranged between the discharge opening 8 and the inlet opening 4 which admits molten salt to the reaction chamber 1, so that while the apparatus is in operation salt is passed into the reaction chamber which has been regenerated and therefore no longer contains any solid (carbonaceous) constituents, since the regeneration medium has already passed through the salt bath.

The regeneration chamber also comprises an outlet 16 for discharging combustion products from the regeneration process, from the salt heating device, or both.

While the apparatus is in operation, the ejection action exerted by the nozzle 13 has the effect of entraining the molten salt with the base material and intimately mixing it therewith. The process may be made more flexible by varying the cross-section of openings 4 by means of a cylindrical slide 17.

The discharge opening 8 for the salt from the separation chamber is an annular slit between the cylindrical part of the chamber 3 and the circular plate 18. By vertically moving the plate 18 in relation to the cylindrical wall of chamber 3, the size of the opening may be varied, thereby regulating the quantity of salt passing to the regeneration chamber 2. The position of the cylindrical wall of the chamber 3 may be regulated at the point 19 in relation to the rest of the apparatus.

Finally, the separation chamber 3 is provided with a conduit or other means 20 for supplying media for quenching the gaseous reaction products.

Figure 2:
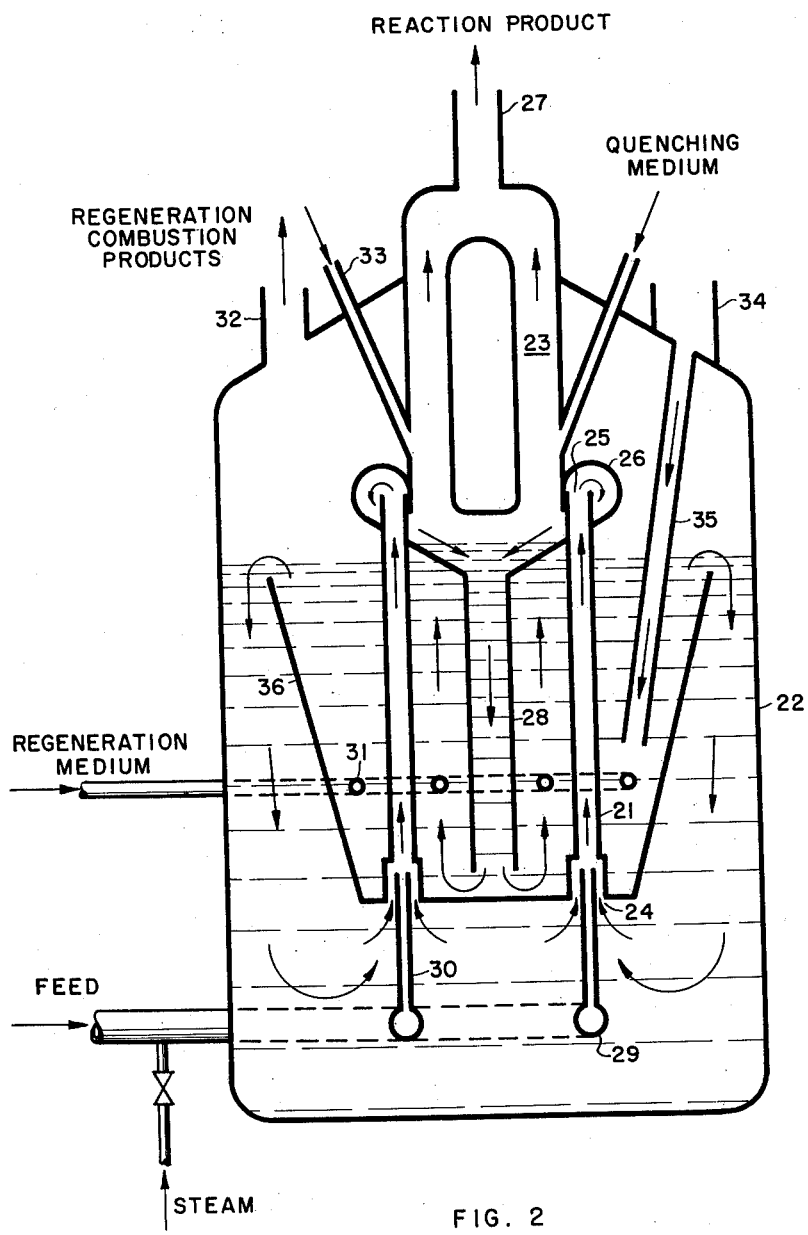
FIG. 2 shows an apparatus comprising several reaction chambers disposed on the circumference of a circle.

The embodiment shown in FIGURE 2, which is especially suitable for apparatuses of larger capacity, comprises several tubular reaction chambers 21 disposed on the circumference of a circle located commonly within regeneration chamber 22 and communicating with a common separation chamber 23.

The cross-section of the salt inlet openings 24 may be regulated (in a way not shown in the figure), as also that of the openings in the embodiment described above. The discharge opening 25 of each reaction chamber communicates with the separation chamber and is surrounded by a separation screen or scroll 26, which, by imparting a centrifugal motion to the effluent from the reaction zone, promotes separation of the heavier salt from the lighter reaction products as they pass into the separation zone 23. The discharge line 27 for gaseous products is in the upper part of the separation chamber and the salt with the constituents it has absorbed passes into the regeneration chamber via a central tube 28, which is fitted with a control slide or valve not shown in the drawing.

The base material arrives via a feed line to an annular line 29 to which are connected the injection tubes 30 which open into the center of each reaction chamber. The regeneration chamber is provided with several tubes 31 having openings through which the regeneration agent is supplied and with an outlet opening 32 for combustion products. The separation chamber contains a conduit 33 for supplying media for quenching the gaseous reaction products.

A heating device 34 to which is connected an immersion tube 35 supplies a supplementary amount of heat to the salt so as to heat it to the temperature necessary for the reaction. A guiding baffle 36 disposed in the regeneration chamber facilitates contacting the salt with the regeneration agent and the heating medium as it returns from the separation chamber into the reaction chambers.

The invention is particularly suited to the cracking of hydrocarbons, for instance, the preparation of ethylene from natural gas, refinery gas, gasolines with a boiling range up to about 200° C., but also from such heavy hydrocarbons as residual oils, as has been experimentally proved. Crude oils may also serve as the base material. Furthermore, the invention is suitable for preparing acetylene from hydrocarbons. The reaction temperature is then higher than in the preparation of ethylene, and the contact time should be very short, e.g. 0.01 second or even less. The acetylene product should be very rapidly quenched in a suitable manner.

In general it may be said that all endothermic reactions requiring high temperatures and a short average contact time may be carried out in principle by means of the process and apparatus according to the invention described in the foregoing. In principle, the process of the invention also allows exothermic reactions to be carried out, for example, reactions which generate a large amount of heat. In fact, the salt is capable of absorbing and giving off a large quantity of heat and in this case it is desirable to provide a quenching means in the regeneration chamber.

The experiments of the examples described below were carried out in an apparatus consisting of a tubular reaction chamber having a diameter of 15 mm. and a length of 300 mm., similar to that in FIGURE 1. The experimental results are as follows:

EXAMPLE I

In order to test the suitability of natural gas or refinery gas to serve as base material for the process, ethylene is prepared from propane.

The tests are carried out at throughputs of 1000, 1500 and 2000 liters of propane per hour, respectively, the reaction temperatures being in the range of 800° C. to 1000° C.

The specific volumetric throughput (this expression denotes the number of cubic volumes at standard conditions of the base material fed in per hour divided by the volume of the reactor) is of the order of magnitude of 30,000. This characteristic value would be of an order of magnitude not exceeding 200–500 in a conventional reactor to which the heat is only transmitted by heat exchange through its walls.

The results of a number of tests are given in the following table:

Table I

| Feed rate, l./h | 1,500 | | | |
|---|---|---|---|---|
| Degree of conversion, weight percent [1] | 75 | | 90 | |
| Temperature of salt, ° C | 905 | | 950 | |
| Composition of gaseous end product | Vol. percent | Weight percent | Vol. percent | Weight percent |
| $H_2$ | 17.1 | 1.4 | 20.6 | 2.0 |
| $CH_4$ | 23.8 | 15.6 | 30.3 | 23.5 |
| $C_2H_2$ | ---- | ---- | 0.6 | 0.7 |
| $C_2H_4$ | 30.2 | 34.5 | 34.7 | 46.8 |
| $C_2H_6$ | 4.5 | 5.5 | 2.7 | 4.0 |
| $C_3H_6$ | 10.5 | 18.0 | 6.4 | 13.0 |
| $C_4H_8$ | 13.9 | 25.0 | 4.7 | 10.0 |
| | 100.0 | 100.0 | 100.0 | 100.0 |

[1] All percentages, as those of the following tests, are based on the amount of base material.

EXAMPLE II

The base material consists of a mixture of propane and propylene, and the other conditions are the same as those of the first example. The results of a number of tests are as follows:

Table II

| Feed rate, l./h | 1,500 | | | |
|---|---|---|---|---|
| Degree of conversion, weight percent | 75 | | 90 | |
| Temperature of salt, ° C | 955 | | 1000 | |
| Composition of gaseous end product | Vol. percent | Weight percent | Vol. percent | Weight percent |
| $H_2$ | 20.6 | 2.0 | 25.0 | 2.8 |
| $CH_4$ | 31.7 | 24.6 | 34.9 | 31.2 |
| $C_2H_2$ | 0.8 | 1.0 | 1.4 | 2.0 |
| $C_2H_4$ | 33.3 | 45.3 | 33.3 | 52.0 |
| $C_2H_6$ | 1.4 | 2.1 | 1.2 | 2.0 |
| $C_3H_6$ | 9.3 | 19.0 | 3.2 | 7.5 |
| $C_4H_8$ | 2.9 | 6.0 | 1.0 | 2.5 |
| | 100.0 | 100.0 | 100.0 | 100.0 |

The difficulties caused by this base material in a conventional reactor on account of excessive coking no longer exist.

EXAMPLE III

The base materials are respectively n-butane and light gasolines from Middle-East crudes. In these tests a small percentage of carbonaceous material is formed, which is readily burnt off in the regeneration chamber. The results of some tests are as follows:

Table III
[n-Butane]

| Feed rate, l./h | 1,500 | | | |
|---|---|---|---|---|
| Degree of conversion, weight percent | 75 | | 90 | |
| Temperature of salt, ° C | 910 | | 955 | |
| Composition of gaseous end product | Vol. percent | Weight percent | Vol. percent | Weight percent |
| $H_2$ | 13.8 | 1.0 | 15.5 | 1.3 |
| $CH_4$ | 24.6 | 14.3 | 28.2 | 18.9 |
| $C_2H_2$ | 0.3 | 0.3 | 0.6 | 0.7 |
| $C_2H_4$ | 30.7 | 31.2 | 36.2 | 42.5 |
| $C_2H_6$ | 3.2 | 3.5 | 2.9 | 3.6 |
| $C_3H_6$ | 14.1 | 21.6 | 10.7 | 18.8 |
| $C_3H_8$ | 1.5 | 3.1 | 1.8 | 4.2 |
| $C_4H_{10}$ | 11.8 | 25.0 | 4.1 | 10.0 |
| | 100.0 | 100.0 | 100.0 | 100.0 |

Table IV
[Gasoline with a boiling range of 35–100° C. (95–212° F.)]

| Feed g./h | 5,050 | | 2,040 | |
|---|---|---|---|---|
| Temperature of salt, ° C | 840 | | 935 | |
| Composition of gaseous end product [1] | Vol. percent | Weight percent | Vol. percent | Weight percent |
| $H_2$ | 23.2 | 2.0 | 23.7 | 2.5 |
| $CH_4$ | 22.4 | 15.5 | 32.4 | 27.3 |
| $C_2H_2$ | ---- | ---- | 1.3 | 1.8 |
| $C_2H_4$ | 29.1 | 35.5 | 34.8 | 51.3 |
| $C_2H_6$ | 4.5 | 5.9 | 2.0 | 3.2 |
| $C_3H_6$ | 15.6 | 28.4 | 4.5 | 10.0 |
| $C_3H_8$ | 5.2 | 12.7 | 1.3 | 3.9 |
| | 100.0 | 100.0 | 100.0 | 100.0 |
| Percentage of condensable end product ($C_5+$) [2] | 35 | | Traces | |

[1] Percentages of the components based on the total amount of gaseous end products.
[2] Percentage based on the quantity of base material.

Table V
[Gasoline with a boiling range of 35–200° C]

| Feed g./h | 2,350 | | 2,300 | |
|---|---|---|---|---|
| Temperature of salt, ° C | 745 | | 925 | |
| Composition of gaseous end product [1] | Vol. percent | Weight percent | Vol. percent | Weight percent |
| $H_2$ | 21.0 | 1.7 | 23.5 | 2.5 |
| $CH_4$ | 20.2 | 13.2 | 31.9 | 26.7 |
| $C_2H_2$ | ---- | ---- | 1.2 | 1.6 |
| $C_2H_4$ | 29.7 | 34.2 | 35.4 | 51.9 |
| $C_2H_6$ | 6.0 | 7.4 | 2.1 | 3.3 |
| $C_3H_6$ | 16.8 | 29.0 | 4.5 | 9.9 |
| $C_3H_8$ | 6.3 | 11.5 | 1.4 | 4.1 |
| | 100.0 | 100.0 | 100.0 | 100.0 |
| Percentage of condensable end product ($C_5+$) [2] | 50 | | About 10 | |

[1] Percentages of the components are based on the total quantity of gaseous end products.
[2] Percentage based on the quantity of base material.

EXAMPLE IV

Cracking of petroleum fractions having a boiling point of over 350° C., ex-Middle-East crudes (residual oils).

The injection tube which supplies the base material to the reaction chamber comprises in this case a steam jacket, but otherwise the equipment is similar to that in the previous examples.

The results are as follows:

Table VI

| Temperature of salt, ° C | 780 |  |
|---|---|---|
| Feed base material g./h | 1,062 | |
| Composition of gaseous end product [1] | Vol. percent | Weight percent |
| $H_2$ | 18.3 | 1.5 |
| $CH_4$ | 20.6 | 13.5 |
| $C_2H_2$ | 0.7 | 0.7 |
| $C_2H_4$ | 38.1 | 43.6 |
| $C_2H_6$ | 2.5 | 3.1 |
| $C_3H_6$ | 13.8 | 23.8 |
| $C_4H_8$ | 6.0 | 13.8 |
| | 100.0 | 100.0 |

[1] Percentages of the components based on the total quantity of gaseous end products.

A proportion of about 50% of the end products consists of condensable hydrocarbons; the above table only indicates the percentages of the gaseous components.

EXAMPLE V

PREPARATION OF VINYL CHLORIDE FROM DICHLOROETHANE

The results of some tests are as follows:

Table VII

| Feed rate, l./h. | Temperature, °C. | Degree of conversion, percent by weight of base material | Specific volumetric throughput |
|---|---|---|---|
| 2.50 | 700 | 60 | 50 |
| 2.00 | 750 | 95 | 40 |
| 2.50 | 790 | 99 | 50 |
| 4.75 | 790 | 95 | 100 |

The experiments concerning the preparation of ethylene show that with increasing degree of conversion the proportion of ethylene in the end product increases, as also the percentage of methane. But the amount of propylene decreases progressively, while that of the other components of the end product only varies slightly. The degree of conversion increases when the reaction temperature increases and/or the throughput falls. It is observed that when the capacity of the described plant is varied, for instance from 1,000 to 2,000 liters per hour, as stated in the first example, the composition of the end product hardly varies, whence it may be inferred that the ratio of the quantities of salt and of the base material cause no difficulties of control within extensive capacity limits, and that in some cases special control is unnecessary.

The favorable results achieved with the process and the apparatus according to the invention are principally due to the short contact time of the base material and the heat transfer medium and their intimate mixing, it being assumed that one of them is in a state of very fine dispersion in the other. In view of the composition of the resultant end product it is clear that variation in residence time in the reaction chamber is also very slight. The critical nature of the foregoing factors becomes apparent when the cracking yields of some of the foregoing examples are compared, at similar levels of hydrocarbon conversion, with the end product yields obtained by conversion, with conventional present day cracking processes. This comparison is made in the following Table VIII:

were heretofore unattainable by conventional processes because of the problem of severe coking. In applicants' process, coking is of course not a problem. To the contrary, the formation of coke is used to advantage.

Besides the possible embodiments already mentioned, the supplementary heating may, of course, also consist of indirect heating of the regeneration chamber, for instance, by placing a source of heat under this chamber. Quenching of the end products has a beneficial effect in that it suppresses the formation of heavier products.

As compared with other heat transfer agents, such as molten metals, salt has the advantage of its very high wetting capacity which gives it a very high power to absorb carbonaceous materials.

It appears from the above that the process of the invention and the apparatus for carrying it out have a great flexibility, so that they are suitable in principle for a large number of different applications.

We claim as our invention:

1. An improved process for carrying out high temperature reactions in the presence of a molten salt heat medium comprising the steps of (1) admixing a base feed material with a molten salt, (2) passing the admixture concurrently through a tubular reaction zone, (3) separating a mixture of molten salt and oxidizable reaction products from the gross reaction products issuing from the reaction zone, (4) passing the separated mixture of molten salt and oxidizable reaction products through a liquid seal of previously separated mixture of molten salt and solid reaction products to a regeneration zone wherein, (5) oxidizable reaction product is essentially completely removed from the molten salt by contacting with an oxidizing gas, and simultaneously the temperature of the molten salt is adjusted suitably for carrying out the reaction in step (2) of the process, and (6) recycling the thus regenerated molten salt to step (1) of the process, which is further characterized in that the average resident time of the feed and reaction products with the molten salt in the reaction zone, excluding that which is separated with the molten salt in the separation zone, does not exceed 0.02 second and the average residence time of the salt in the separation zone does not exceed 0.5 second.

2. The process of claim 1 in which the average contact

Table VIII

COMPARISON WITH HYDROCARBON CRACKING YIELDS FROM CONVENTIONAL PROCESSES

| Feed | Propane | | Propane/propylene | | S.R. gasoline [1] | |
|---|---|---|---|---|---|---|
| | Applicants' invention | Conventional processing [2] | Applicants' invention | Conventional processing [2] | Applicants' invention | Conventional processing [2] |
| Conversion | 90 | 87.7 | 90 | 82.0 | [3] 65 | [3] 70.3 |
| Yield Distribution: A. Gaseous end product (percent by volume of total gaseous end product): | | | | | | |
| $H_2$ | 20.6 | 13.7 | 25.0 | 13.8 | 23.2 | 11.2 |
| $CH_4$ | 30.3 | 34.5 | 34.9 | 31.4 | 22.4 | 31.4 |
| $C_2H_2$ | 0.6 | 0.2 | 1.4 | 0.3 | | 25.2 |
| $C_2H_4$ | 34.7 | 25.7 | 33.3 | 26.5 | 29.1 | |
| $C_2H_6$ | 2.7 | 10.4 | 1.2 | 4.9 | 4.5 | 8.5 |
| $C_3$'s | 6.4 | 14.4 | 3.2 | 22.6 | 20.8 | 15.5 |
| $C_4$'s | 4.7 | 1.1 | 1.0 | 0.5 | | 8.2 |
| | 100.0 | 100.0 | 100.0 | 100.0 | 100.0 | 100.0 |
| B. Pentanes and heavier (percent by weight of total feed) | None | 1.3 | None | 3.3 | 3.5 | 29.7 |

[1] Applicants' feed 95–212° F. gaso., "conventional" feed 89–215° F. gaso.
[2] Cracking primarily for ethylene, once through basis.
[3] Calculated as 100—percent weight $C_5+$ product.

The foregoing data show (1) that substantially better selectivity, as evidenced by the significantly higher ethylene yields, is obtained (2) with essentially no polymerization, which are indeed unexpected at the same level of conversion. Moreover, even higher selectivity is obtained with applicants' process at yet higher conversions, which time of the feed and reaction products with the molten salt does not exceed 0.01 second.

3. The process of claim 1 in which the oxidizing gas is selected from the group consisting of air, oxygen, and mixtures thereof.

4. The process of claim 1 in which the adjustment of the temperature of the molten salt is accomplished at least in part by introduction of a combustible gas into the regeneration zone, the heat of combustion from which raises the temperature of the molten salt to a temperature suitable for carrying out the reaction in step (2) of the process.

5. The process of claim 1 in which the adjustment of the temperature of the molten salt is accomplished at least in part by introduction of hot combustion gases into the regeneration zone, the sensible heat from which raises the temperature of the molten salt to a temperature suitable for carrying out the reaction in step (2) of the process.

6. The process of claim 1 in which the molten salt heat transfer medium is an alkali metal salt selected from the group consisting of sulfates, chlorides, and double salts thereof.

7. The process of claim 6 in which the molten salt heat transfer medium is selected from the group consisting of potassium salts and mixtures thereof.

8. An apparatus for carrying out high temperature reactions in the presence of molten salt heat media which comprises (1) at least one vertical tubular reaction chamber having an inlet for supplying base feed material, an inlet for supplying molten salt, and a reaction product outlet communicating with a separation chamber (2) a separation chamber communicating with the outlet of the reaction chamber having an outlet for separated reaction product and a liquid seal of molten separated salt communicating with a regeneration chamber, and (3) a regeneration chamber which surrounds at least a major proportion of the reaction chamber, which chamber has inlet means for passing molten salt from the separation chamber to the regeneration chamber, means for intimately contacting the molten salt with gaseous regeneration media, and outlet means for supplying regenerated molten salt to the reaction chamber.

9. The apparatus of claim 8 in which the base feed material inlet and molten salt inlet are an ejector for which the base feed material is the motive fluid.

10. The apparatus of claim 9 in which the cross sectional area of the molten salt inlet to the reaction zone may be regulated.

11. The apparatus of claim 8 in which the regeneration zone is equipped with supplemental heating means for heating the regenerated molten salt.

12. The apparatus of claim 8 in which the separation chamber is provided with means for quenching the separated reaction products.

13. The apparatus of claim 8 which comprises a plurality of reaction zones, disposed on the circumference of a circle annularly within a single regeneration zone, communicating with a common separation zone having a centrally disposed molten salt liquid seal communicating with the single regeneration zone.

14. An apparatus for carrying out high temperature reactions of a base feed material in the presence of molten salt heat media comprising a vertically disposed, elongated tubular reactor, means for separately introducing the feed material and molten salt to the base of said tubular reactor, a regeneration chamber of an annular cross-section encircling at least the lower portion of the reactor and having as its inner wall the outer wall of the encircled reactor, a separation chamber in communication with the reactor and adapted to receive therefrom an upwardly flowing stream of molten salt, base feed and reaction products, the separation chamber being provided with baffling for momentarily changing the direction of flow of said stream to effect a separation of the molten salt therefrom and with provision for collecting and holding a pool of molten salt in the lower portion of the separation chamber, the separation chamber being provided with an opening permitting the flow of molten salt from the separation chamber to the regeneration chamber, means for injecting a quenching medium into an upper portion of the separation chamber beyond the baffling, and a dispersing means disposed in the regeneration chamber for introducing and contacting regeneration medium with the molten salt.

15. An improved process for cracking hydrocarbon feeds to produce mainly ethylene, which comprises the steps of (1) admixing the hydrocarbon feed with molten salt having a temperature of from about 750 to about 1,000° C., (2) passing the admixture concurrently at high velocity through a tubular reaction zone to a separation zone, (3) separating the gross reaction product issuing from the reaction zone into two parts consisting essentially of (a) a mixture of hydrocarbon vapors and (b) a mixture of molten salt containing oxidizable carbonaceous solids, (4) recovering the hydrocarbon vapors (5) passing the separated mixture of molten salt through a liquid seal of previously separated molten salt to a regeneration zone, (6) removing the oxidizable carbonaceous solids from the molten salt by contacting the mixture with an oxidizing gas and simultaneously adjusting the temperature of the molten salt to a temperature of from about 750 to 1,000° C., and (7) recycling the thus regenerated molten salt to step (1) of the process which is further characterized in that the average contact time of the hydrocarbon feed and reaction products with the molten salt, excluding the carbonaceous solids which are separated with the molten salt, does not exceed 0.02 second and the average residence time of the salt in the separation zone does not exceed 0.5 second.

16. The process of claim 14 in which the hydrocarbon feed consists essentially of normally gaseous hydrocarbons, the temperature of the molten salt is from about 800 to about 1,000° C., and the average residence time of the salt in the separation zone does not exceed 0.1 second.

17. The process of claim 14 in which the hydrocarbon feed is a residual oil having an initial boiling point of at least about 350° C. and the temperature of the molten salt is from about 750 to about 900° C.

18. The process of claim 14 in which the salt is selected from the group consisting of barium chloride and mixtures of potassium and sodium chlorides.

References Cited in the file of this patent

UNITED STATES PATENTS

| | | |
|---|---|---|
| 1,926,563 | Seifer | Sept. 12, 1933 |
| 2,031,987 | Sullivan | Feb. 25, 1936 |
| 2,053,211 | Villars | Sept. 1, 1936 |
| 2,055,313 | Ruthruff | Sept. 22, 1936 |
| 2,354,354 | Abrams | July 25, 1944 |
| 2,730,488 | De Rosset et al. | Jan. 10, 1956 |
| 2,885,343 | Woebcke | May 5, 1959 |

FOREIGN PATENTS

| | | |
|---|---|---|
| 220,732 | Great Britain | Aug. 26, 1924 |